United States Patent [19]

Valette et al.

[11] Patent Number: 5,223,030
[45] Date of Patent: Jun. 29, 1993

[54] HYBRID BINDER HAVING REDUCED ORGANIC SOLVENT CONTENT FOR USE IN REFRACTORY MOLDS

[75] Inventors: Dominique E. Valette, Massy, France; Dennis Yarwood, Amersfoort, Netherlands

[73] Assignee: Akzo N.V., Arnhem, Netherlands

[21] Appl. No.: 800,944

[22] Filed: Dec. 2, 1991

[30] Foreign Application Priority Data

Dec. 3, 1990 [EP] European Pat. Off. ........ 90203179.8

[51] Int. Cl.$^5$ .......................... C04B 35/14; B22C 1/20
[52] U.S. Cl. ............... 106/38.2; 106/287.14; 106/287.16
[58] Field of Search ............. 106/38.2, 287.14, 287.16, 106/38.35

[56] References Cited

U.S. PATENT DOCUMENTS

| | | | |
|---|---|---|---|
| 3,392,036 | 7/1968 | McLeod | 106/1.17 |
| 3,432,312 | 3/1969 | Feagin | 106/38.3 |
| 3,576,652 | 4/1971 | Teicher et al. | 106/38.35 |
| 3,961,968 | 6/1976 | Wales | 106/38.35 |
| 4,769,076 | 9/1988 | Watanabe et al. | 106/38.35 |

FOREIGN PATENT DOCUMENTS 207864  1/1987  European Pat. Off. .
146797  3/1981  German Democratic Rep. .

*Primary Examiner*—Mark L. Bell
*Assistant Examiner*—Margaret Einsmann
*Attorney, Agent, or Firm*—Richard P. Fennelly; Louis A. Morris

[57] ABSTRACT

A fast-curing hybrid binder is disclosed which is suitable for use in refractory molds, which has the advantage of a reduced organic-solvent content. The binder contains two silica sources: colloidal silica and a prehydrolyzed organosilicate in the form of a mixture of an alkylpolysilicate and an alkyl or aryl alkoxy silane, preferably selected from the group consisting of $C_1$ to $C_6$ alkyl trialkoxy silanes, di ($C_1$ to $C_6$) alkyl dialkoxy silanes, phenyl trialkoxy silane, diphenyl dialkoxy silane, and mixtures thereof. Preferably, the alkylpolysilicate is prehydrolyzed tetraethyl orthosilicate and the alkoxy silane is methyl triethoxy silane, dimethyl diethoxy silane or a mixture thereof.

7 Claims, No Drawings

HYBRID BINDER HAVING REDUCED ORGANIC SOLVENT CONTENT FOR USE IN REFRACTORY MOLDS

BACKGROUND OF THE INVENTION

The invention pertains to a liquid, silica-based binder suitable for use in the manufacture of refractory molds, the silica base comprising at least two types of silica sources, one of them being colloidal silica, and the other being a prehydrolyzed organosilicate.

Silica-based binders are frequently used for the bonding of refractories in the metals investment casting process. The particular binder of the aforementioned type is commonly referred to as a hybrid binder on account of the combination of the two silica sources. One such binder has been disclosed in U.S. Pat. No. 3,576,652 to Teicher et. al.

In general, hybrid binders are utilized in view of their combining the favorable characteristics of the two silica sources while suppressing their drawbacks. The prehydrolyzed organic silicate, more particularly, prehydrolyzed organic ethyl silicate, is chosen for its high refractoriness and rapid drying. Advantages of colloidal silica sols include high bond strength and good slurry stability.

The hybrid binders used at present in foundries are fastcuring by virtue of the presence of prehydrolyzed organosilicate. To dissolve the organosilicate, the conventional hybrid binders essentially comprise a volatile organic solvent, such as ethanol.

It is commonly recognized that the presence of water in organosilicate-containing binders should be prevented. Water residues are known to impair the binder's stability, i.e., to cause gelation. Unstable binders would require immediate processing. Since in foundries it is generally preferred not to prepare the binder in situ, also because most foundries do not have the appropriate equipment, the state of the art binders delivered to foundries are organic solvent based In line herewith, the Teicher disclosure referred to above describes systems which are virtually water-free.

Though organic solvents are necessary for obtaining a stable and satisfactory product, releasing large amounts of volatiles into foundries is no longer acceptable for health and environmental reasons This forms a serious drawback to the use of state of the art fast-curing hybrid binders.

DESCRIPTION OF THE INVENTION

It is an object of the invention to provide a fast-curing hybrid binder suitable for use in investment casting in which the organic solvent is replaced in part by water, without the binder's stability and curing characteristics being negatively affected.

The invention relates to a binder of the above-described known type in which the prehydrolyzed organosilicate is the product of the hydrolysis of a mixture of an alkyl silicate and an alkoxy silane such as an alkyl trialkoxy silane, a dialkyl dialkoxy silane, an aryl trialkoxy silane, a diaryl dialkoxy silane, and mixtures thereof.

In other words, the prehydrolyzed organosilicate comprises a mixture of an alkyl polysilicate and a polymer of the alkoxy silane, as hydrolyzation causes the silicate and the silane to polymerize As is self-evident from the above, water will be part of the binder-liquid of the binders in accordance with the present invention as eventually used. In this respect, the invention pertains to ready-to-use binders containing the binder liquid, including water, and to binder concentrates, which comprise the above-mentioned ingredients according to the invention and which are to be diluted with water before use.

Preferably, a ready-to-use binder according to subject invention will be composed of (a) 10–40 wt % of the silica base, (b) 20–60 wt % of a water miscible organic solvent, and (c) 20–60 wt % of water. More preferably, a binder concentrate according to subject invention will be composed of (a1) 30–50 wt % of the silica base, and (b1) 50–70 wt % of a water miscible organic solvent.

It should be noted that the use of alkyl trialkoxy silanes and dialkyl dialkoxy silanes in binders for use in refractory molds in itself is known from several publications. Such disclosures, however, either do not relate to fast-curing hybrid binders or they do not relate to binders with reduced organic solvent content.

Thus, from European Patent Publication No. 207,864 a binder for the manufacture of precision casting molds is known which contains the following components: (i) an organosilica sol; (ii) an alkyl silicate or an alkoxy organosilane; and (iii) a binder-soluble amine Though the possibility of combining the alkyl silicate and the alkoxy organosilane and thus preparing a binder in which component (ii) is a mixture is referred to in this patent reference, such a mixture is not actually disclosed and no favorable effect on the organic solvent content that is connected with using an alkyl or aryl trialkoxy silane and/or dialkyl or diaryl dialkoxy silane can therefore be derived from it. In fact, the artisan is even taught away from the present invention since in this patent document it is stated that the binder components should be blended in the absence of water. Further, the water content of the binder does not exceed 5%, by weight, with a maximum of 1%, by weight, being preferred.

Further, it is known from U.S. Pat. No. 3,432,312 to use methyl trimethoxy silane, methyl triethoxy silane or methyl triisopropoxy silane in a binder for refractory molds. The silane is added to enhance the green strength of molds and cores prepared from the binder and a refractory aggregate. The disclosure of this patent does not pertain to hybrid binders and essentially relates to slow-curing binders which contain water as the binder-liquid. The present solution to a problem connected with fast-curing hybrid binders would not be derived from such a disclosure.

Another disclosure of ethyl triethoxy silane and/or diethyl diethoxy silane as a constituent in a binder for investment casting is to be found in East German Pat. No. 146, 797. This reference also has no bearing on hybrid binders but relates to conventional ethyl silicate-based binders.

Consequently, present solution to the organic solvent problem associated with fast-curing hybrid binders would not be derived from these disclosures.

Various aspects and preferred embodiments of the present invention will be explained in more detail below.

As has been made clear above, the prehydrolyzed organo silicate of the present invention is a mixture. One component of the mixture is the commonly utilized prehydrolyzed alkyl silicate, which is generally referred to as alkyl polysilicate. Suitable liquid alkyl silicates are known in the art and can be illustrated with the following structural formula:

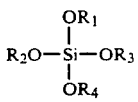

wherein $R_1$, $R_2$, $R_3$, and $R_4$ independently represent a hydrocarbon group having from 1 to 8 carbon atoms. Such hydrocarbon groups may be alkyl groups such as methyl, ethyl, propyl, and other homologues, branched alkyls such as isobutyl and ethylhexyl, cycloalkyls such as cyclohexyl and cyclopentyl, aryl groups, such as phenyl, tolyl and xylyl, etc. Alkyl silicates alternatively may be low condensation products of tetra alkoxy silicates according to the above formula. Prehydrolysis of alkyl silicates generally results in the formation of an alkyl polysilicate.

Preferably, the prehydrolyzed alkyl silicate is an alkyl polysilicate derived from tetramethoxy silane, tetraethoxy silane, tetrapropoxy silane, tetrabutoxy silane or tetraphenoxy silane. The most preferred silane is tetraethoxy silane. It can also be advantageous to make use of mixtures of alkyl silicates.

The other component in the organosilicate mixture, and the key component in reducing volatile organic solvents, is alkyl trialkoxy'silane, dialkyl dialkoxy silane, aryl trialkoxy silane, diaryl dialkoxy silane, or a mixture thereof.

Preferred alkyl alkoxy silanes can be illustrated with the following formulae:

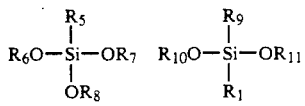

wherein $R_6$, $R_7$, $R_8$, $R_{10}$, and $R_{11}$ may independently represent the same groups as defined above under $R_1$ to $R_4$ and $R_5$, $R_9$ and $R_1$ represent an alkyl group having from 1 to 6 carbon atoms. Examples of such alkyl groups are linear alkyl groups such as methyl, ethyl, and homologues, branched alkyl groups, e.g. isopropyl and isobutyl or cycloalkyl groups such as cyclopentyl and cyclohexyl. Preferred alkyl groups are methyl, ethyl, and isopropyl. Particularly preferred alkyl alkoxy silanes are methyl trimethoxy silane, methyl triethoxy silane, methyl triisopropoxy silane, ethyl triethoxy silane, diethyl diethoxy silane, and mixtures thereof. The most preferred prehydrolyzed alkyl alkoxy silane is methyl triethoxy silane, dimethyl diethoxy silane or a mixture thereof.

Preferred aryl alkoxy silanes are phenyl trialkoxy silane and diphenyl dialkoxy silane, in which the alkoxy groups may be the same groups as identified above for the alkyl alkoxy silanes. The preferred aryl alkoxy silane is phenyl triethoxy silane.

The silica base in the hybrid binder according to the present invention is further comprised of colloidal silica. Such colloidal silica may be utilized in the form of an organic, organo-aqueous, or aqueous sol.

Suitable organic liquids in which the colloidal silica may be dispersed are, e.g., aliphatiq hydrocarbons such as hexane or heptane, aromatic hydrocarbons such as toluene and xylene, alcohols such as ethanol and isopropanol and ethers such as glycol ether. Hexane, heptane, toluene and xylene can be rendered water-miscible by the addition of a minor amount of a mutual solvent, e.g. isopropanol or ethanol.

When the colloidal silica is applied in the form of an organo-aqueous or aqueous sol, the water present therein generally is used for hydrolysing the organic silicate, in order to prepare a prehydrolyzed silicate not containing water residues. Of course, in accordance with the present invention, such water residues need not be prevented per se.

It is preferred to make use of an aqueous silica sol. The silica base preferably is comprised of 40-80 wt % of colloidal silica, 5-50 wt % of $SiO_2$ in the form of alkylpolysilicate and 5-30 wt % of $SiO_2$ in the form of the above-identified alkyl alkoxy silane.

The hybrid binder according to the present invention contains a reduced amount of an organic solvent, which serves to dissolve the alkyl silicate. Suitable solvents essentially are those mentioned above with reference to the organic silica sol. Preferred are lower alkyl alcohols and ethers, with the highest preference being given to ethanol, isopropanol and 1-methoxy 2-propanol.

If tetraethyl orthosilicate is used to prepare the prehydrolyzed alkylpolysilicate, ethanol is liberated upon hydrolysis. It is most convenient and preferred to then have ethanol as the organic solvent. It is a cheap and favorable alternative to further dilute the binder with isopropanol.

Another preferred embodiment is to use a combination of an alcohol and glycol ether. It should be noted that the use of glycol ether in hybrid silica binders is known from U.S. Pat. No. 3,961,968 to Wales, which is incorporated herein by reference for all purposes. The Wales disclosure teaches binders having a reduced alcohol content, but the solution given still requires the presence of a large amount of organic solvent, viz. glycol ether.

In a preferred embodiment the present invention pertains to a hybrid binder suitable for use in refractory molds comprising:
 0-15 wt % of colloidal silica in the form of an aqueous dispersion
 5-10 wt % of silica in the form of a prehydrolyzed organosilicate comprising 25-75 wt % of silica in the form of tetraethyl orthosilicate and 75-25 wt % of silica in the form of methyl triethoxy silane, dimethyl diethoxy silane or a mixture thereof
 35-45 wt % of water, and
 35-45 wt % of ethanol, isopropanol, 1-methoxy 2-propanol or a mixture thereof A highly stable product is obtained employing a further preferred embodiment, in which the prehydrolyzed organosilicate is comprised of about 50 wt % of silica in the form of tetraethyl orthosilicate and about 50 wt % of silica in the form of methyl triethoxy silane. Preferably the binder containing this particular prehydrolyzed silicate mixture is formed of about 13 wt % of colloidal silica in the form of an aqueous sol, 7 wt % of silica in the form of said particular prehydrolyzed silicate mixture, 40 wt % of water, and 40 wt % of a mixture of ethanol and isopropanol in a weight ratio of about 1:1.

The invention will be explained further with reference to the following Examples. The Examples should be regarded as illustrating rather than limiting the scope of the present invention.

EXAMPLES

In the Examples the general procedure outlined below was followed. The particular components added and the amounts used can be read from the Table.

Charged into a glass vessel, with stirring, were:
an aqueous silica sol
water, and
sulfuric acid, after which the mixture was homogenized for ten minutes.

Subsequently, an organic solvent was added, after which an organosilicate was slowly added within a period of one hour, the temperature of the reaction mixture being kept at 30°-35° C. In the Examples in accordance with the present invention the organosilicate was a fresh mixture comprised of alkyl silicate and alkyl alkoxy silane.

After the organosilicate mixture addition had been completed, the reaction mixture was stirred during three hours at 30°-35° C, after which the end product was obtained.

In the Examples and Comparative Examples given below, the following abbreviations are used:

SOL: Aqueous dispersion of colloidal silica having a wide particle size distribution, particle diameters being in the range of 40-100 nm, with a specific surface area of from 75 to 80 m g. The particular sol was obtained from PQ corporation.

TEOS: Tetraethyl orthosilicate (obtained from Akzo)

MTES: Methyl triethoxy silane (obtained from Huls)

DMDES: Dimethyl diethoxy silane (obtained from Wacker)

NAPSOL: 1-methoxy 2-propanol (Napsol PMI, registered trademark of BP Chimie)

Stability is measured in an oven at 50° C. The results are rated as follows:

(−) = unstable (<5 days)
(a) = acceptable stability (5-15 days)
(+) = good stability (15-25 days)
(++) = excellent stability (>25 days)

Examples indicated with "E" are in accordance with the present invention, Comparative Examples, indicated with "C", are not in accordance with the present invention.

Binder concentrates were prepared in analogous manner as the above binders, i.e. partially or entirely omitting the addition of water. Stability was measured for concentrates as well as the resulting diluted ready-to-use binders. These Examples too have been listed in the Table. Dilution is carried through by charging into a glass vessel, with stirring, 60 g of concentrate, slowly adding water, together or not with an additional amount of the water-miscible organic solvent, and homogenizing for fifteen minutes.

TABLE

| Test Sample | % SiO$_2$ Total | % SiO$_2$ Sol | % SiO$_2$ TEOS | % SiO$_2$ MTES | % SiO$_2$ DMDES | % Ethanol | % iso-propanol | % Napsol | % Water | Stability |
|---|---|---|---|---|---|---|---|---|---|---|
| E1 | 20 | 10 | 7 | 3 | — | 28.6 | 11.4 | — | 40 | a |
| E2 | 20 | 10 | 5 | 5 | — | 27 | 13 | — | 40 | + |
| C1 | 20 | 10 | 10 | — | — | 40 | — | — | 40 | — |
| E3 | 20 | 12 | 7 | 1 | — | — | — | 40 | 40 | a |
| E4 | 20 | 12 | 7 | — | 1 | 23.3 | 16.7 | — | 40 | a |
| E5 | 20 | 12 | 6 | — | 2 | 21.6 | 18.4 | — | 40 | a |
| E6 | 20 | 12 | 6 | 2 | — | 23.2 | — | 16.8 | 40 | + |
| E7 | 20 | 12 | 5 | 3 | — | 22.4 | 17.5 | — | 40 | + |
| E8 | 20 | 12 | 4 | 4 | — | 21.6 | 18.4 | — | 40 | + |
| E9 | 20 | 13 | 2 | 5 | — | 17.7 | 22.3 | — | 40 | a |
| E10* | 20 | 13 | 5.5 | 1.5 | — | 20.5 | 19.5 | — | 40 | + |
| E11 | 20 | 13 | 3.5 | 3.5 | — | 18.9 | 21.1 | — | 40 | ++ |
| E12 | 20 | 13 | 3.5 | 3.5 | — | 18.9 | — | 21.1 | 40 | + |
| E13 | 20 | 13 | 5 | 2 | — | 20.1 | 19.9 | — | 40 | ++ |
| E14 | 20 | 13 | 4 | 3 | — | 19.3 | 20.7 | — | 40 | ++ |
| E15 | 20 | 13.33 | 3.33 | 3.33 | — | 18 | 22 | — | 40 | ++ |
| E16 | 20 | 14 | 4 | 2 | — | 17 | 23 | — | 40 | ++ |
| C3 | 20 | 13 | 7 | — | — | 21.6 | 19.3 | — | 40 | — |
| C4 | 20 | 15 | 5 | — | — | 15.5 | 24.5 | — | 40 | — |
| C5 | 20 | 15 | 5 | — | — | 15.5 | — | 24.5 | 40 | — |
| E17 Concentrate: | 33 | 13 | 15.9 | 4.1 | — | 60 | 7 | — | — | a |
| E17 Diluted: | 20 | 7.9 | 9.6 | 2.5 | — | 35.8 | 4.2 | — | 40 | a |
| E18 Concentrate: | 33 | 21.4 | 9.1 | 2.5 | — | 53.3 | — | — | 13.7 | a |
| E18 Diluted: | 20 | 13 | 5.5 | 1.5 | — | 32 | — | — | 48 | a |
| | 20 | 13 | 5.5 | 1.5 | — | 32 | 8 | — | 40 | ++ |

*E10 when formulated with 40% 1-methoxypropanol, rather than the blend of ethanol and isopropanol, forms a preferred high flash, reduced organic solvent content hybrid binder for use in making refractory shell molds.

We claim:

1. A liquid, silica-based binder suitable for use in refractory molds, the silica base comprising at least two types of silica sources, one of them being colloidal silica, and the other a prehydrolyzed organosilicate, characterized in that the prehydrolyzed organosilicate is the product of the hydrolysis of a mixture of an alkyl silicate and an alkoxy silane and the binder is comprised of
'(a) 10-40 wt % of the silica base,
(b) 20-60 wt % of a water miscible organic solvent, and
(c) 20-60 wt % of water.

2. A binder according to claim 1, characterized in that the alkoxy silane is an alkyl alkoxy silane selected from the group consisting of an alkyl trialkoxy silane, a dialkyl dialkoxy silane, and mixtures thereof.

3. A binder according to claim 1, characterized in that the alkoxy silane is an alkyl alkoxy silane selected from the group consisting of an alkyl trialkoxy silane, methyl triisopropoxy silane ethyl triethoxy silane, diethyl diethoxy silane, and mixtures thereof.

4. A binder according to claim 3, characterized in that the alkyl alkoxy silane is methyl triethoxy silane, diethyl diethoxy silane or a mixture thereof.

5. A binder according to claim 2, characterized in that the alkyl silicate is selected from the group consisting of tetramethoxy silane, tetraethoxy silane, tetrapropoxy silane, tetrabutoxy silane, and tetraphenoxy silane.

6. A liquid, silica-based binder suitable for use in refractory molds, the silica base comprising at least two types of silica sources, one of them being colloidal silica, and the other a prehydrolyzed organosilicate, characterized in that the prehydrolyzed organosilicate, characterized in that the prehydrolyzed organosilicate is the product of the hydrolysis of a mixture of an alkyl silicate and an alkoxy silane and the binder is comprised of 10-15 wt % of colloidal silica in the form of an aqueous dispersion, 5-10 wt % of silica in the form of a prehydrolyzed organosilicate comprising 25-75 wt % of silica in the form of tetraethoxy silane and 75-25 wt % of silica in the form of methyl triethoxy silane, dimethyl diethoxy silane or a mixture thereof, 35-45 wt % of water, and 35-45 wt % of ethanol, isopropanol, 1-methoxy 2-propanol or a mixture thereof.

7. A binder according to claim 6, characterized in that it is comprised of about 13 wt % of colloidal silica in the form of an aqueous dispersion about 7 wt % of a prehydrolyzed organosilicate comprising about 50 wt % of silica in the form of tetraethyl orthosilicate and about 50 wt % of silica in the form of methyl triethoxy silane, about 40 wt % of water, and about 40 wt % of a mixture of ethanol and isopropanol in a weight ratio of about 1:1.

* * * * *